United States Patent
Gothoskar et al.

(10) Patent No.: US 9,419,718 B2
(45) Date of Patent: Aug. 16, 2016

(54) ALIGNING OPTICAL COMPONENTS IN A MULTICHANNEL RECEIVER OR TRANSMITTER PLATFORM

(71) Applicant: Cisco Technology, Inc., San Jose, CA (US)

(72) Inventors: Prakash Gothoskar, Allentown, PA (US); Vipulkumar Patel, Breinigsville, PA (US); Kalpendu Shastri, Orefield, PA (US); Rao V. Yelamarty, Allentown, PA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/462,239

(22) Filed: Aug. 18, 2014

(65) Prior Publication Data

US 2016/0050019 A1     Feb. 18, 2016

(51) Int. Cl.
| | |
|---|---|
| *G02B 5/08* | (2006.01) |
| *G02B 6/28* | (2006.01) |
| *H04B 10/40* | (2013.01) |
| *G02B 6/42* | (2006.01) |

(52) U.S. Cl.
CPC ............... *H04B 10/40* (2013.01); *G02B 6/423* (2013.01); *G02B 6/4215* (2013.01); *G02B 6/4244* (2013.01); *G02B 6/4249* (2013.01)

(58) Field of Classification Search
CPC ............ H04B 10/40; G02B 5/08; G02B 6/28
USPC ...................................... 398/135; 385/24, 33
See application file for complete search history.

(56) References Cited

U.S. PATENT DOCUMENTS

| | | | | |
|---|---|---|---|---|
| 5,835,517 | A | * | 11/1998 | Jayaraman ........... G02B 6/2938 372/101 |
| 6,711,326 | B2 | | 3/2004 | Sugita et al. |
| 7,349,602 | B2 | | 3/2008 | Panotopoulos |
| 7,817,883 | B2 | * | 10/2010 | Morris ............... G02B 6/29367 385/24 |
| 8,537,468 | B1 | | 9/2013 | Wang et al. |
| 2002/0037141 | A1 | | 3/2002 | Miyamoto et al. |
| 2002/0154857 | A1 | | 10/2002 | Goodman et al. |
| 2003/0012246 | A1 | | 1/2003 | Klimek et al. |

(Continued)

FOREIGN PATENT DOCUMENTS

| | | |
|---|---|---|
| EP | 0640853 A1 | 7/1994 |
| WO | 2013125728 A1 | 8/2013 |

OTHER PUBLICATIONS

European Patent Office, International Search Report and Written Opinion, PCT/US2015/045489, 10 pages, dated Nov. 25, 2015.

*Primary Examiner* — Oommen Jacob
(74) *Attorney, Agent, or Firm* — Patterson + Sheridan, LLP

(57) ABSTRACT

Embodiments described herein describe a sub-mount that is etched to include respective cavities with at least two adjacent sides that align optical filters and a mirror. Moreover, the cavities are arranged on the sub-mount such that when the filters and mirror are disposed in the cavities, they align in a manner that enables the performance of a multiplexing or demultiplexing function as part of, for example, a zigzag multiplexer/demultiplexer. In one embodiment, the filters and mirrors are aligned passively rather than actively. The sub-mount may then be placed on a substrate that includes other components of a ROSA or TOSA. In one embodiment, the substrate is also etched to include a cavity two adjacent sides to align the sub-mount so that sub-mount is passively aligned once disposed into the cavity.

12 Claims, 6 Drawing Sheets

(56) References Cited

U.S. PATENT DOCUMENTS

| | | |
|---|---|---|
| 2003/0063889 A1 | 4/2003 | Lavallee et al. |
| 2003/0095744 A1 | 5/2003 | Takano et al. |
| 2005/0152640 A1* | 7/2005 | Lemoff ................. G02B 6/125 385/24 |
| 2006/0177177 A1* | 8/2006 | Jenkins .............. G02B 6/12007 385/33 |
| 2007/0160321 A1* | 7/2007 | Wu .................... G02B 6/12021 385/24 |
| 2009/0108271 A1* | 4/2009 | Chou .................. H01L 25/0753 257/88 |
| 2009/0268772 A1* | 10/2009 | Arimoto ................. H01S 5/141 372/50.23 |
| 2010/0142067 A1* | 6/2010 | Hanamura ........... G02B 26/001 359/850 |
| 2010/0237037 A1* | 9/2010 | Lin ....................... C04B 41/009 216/13 |
| 2013/0343699 A1 | 12/2013 | Margalit et al. |

* cited by examiner

ALIGNING OPTICAL COMPONENTS IN A MULTICHANNEL RECEIVER OR TRANSMITTER PLATFORM

TECHNICAL FIELD

Embodiments presented in this disclosure generally relate to passively aligning optical components used for muxing/demuxing a multi-wavelength optical signal. More specifically, embodiments disclosed herein dispose the optical components onto a substrate with pre-fabricated cavities.

BACKGROUND

The cost of Receiver Optical Sub-Assemblies (ROSA) and Transmitter Optical Sub-Assemblies (TOSA) to a large extent is affected by the cost of packaging. The packaging cost in turn is often driven by the need to actively align the optical components within the ROSA/TOSA with high precision and within tight tolerances. Actively aligning these components also affects the cost of the manufacturing equipment, overall quality, yield, and manufacturability.

Multi-wavelength optical sub-assemblies are typically based upon demultiplexing (in the case of a ROSA) and multiplexing (in the case of a TOSA) using thin film filters (TFF) and mirrors to achieve wavelength separation or combination. However, the filters and mirrors require high precision optical alignments through active tuning. Such high precision active alignment increases assembly time and cost. The growth of data centers has increased the demand for cheaper and more compact optical sub-assemblies.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
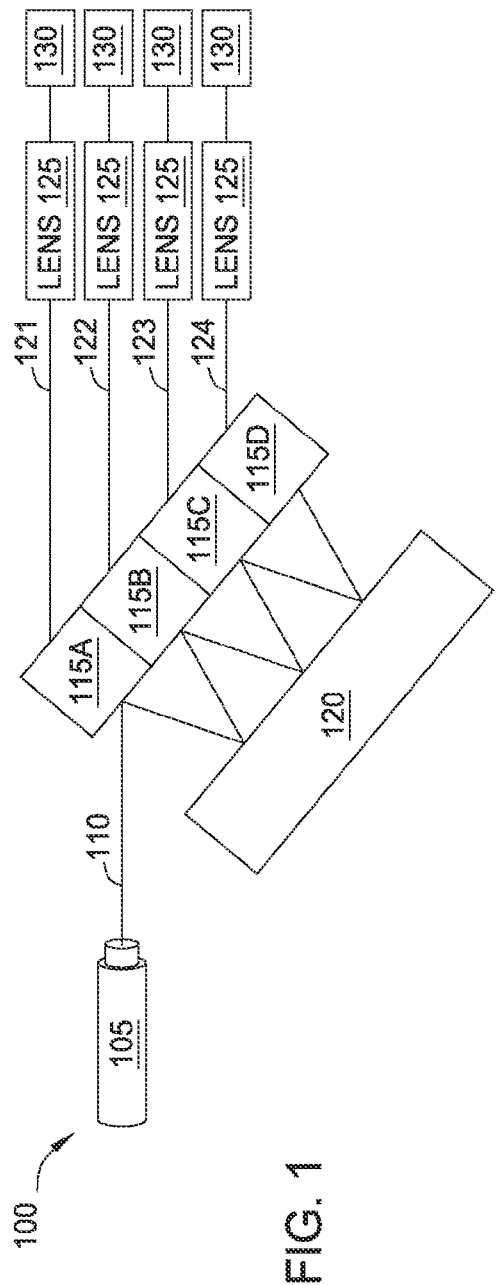
FIG. 1 illustrates demultiplexing a multi-wavelength optical signal, according to one embodiment described herein.

One embodiment presented in this disclosure is a method that includes disposing a mirror into a first cavity such that respective surfaces of the mirror and first cavity are brought into contact and urge the mirror and first cavity into a first predetermined relationship with one another. The method also includes disposing an optical filter into a second cavity such that respective surfaces of the optical filter and second cavity are brought into contact and urge the optical filter and second cavity into a second predetermined relationship with one another. Furthermore, the first and second cavities are arranged relative to each other so that disposing the mirror and optical filter cause the mirror and the optical filter to be passively aligned to perform one of a demultiplexing and multiplexing function using an optical signal incident on the optical filter.

Another embodiment presented in this disclosure is an optical device that includes a substrate with a first cavity and a second cavity, each extending from a same surface into the substrate. The device includes a mirror disposed in the first cavity where respective surfaces of the mirror and first cavity are in contact and arrange the mirror and first cavity in a first predetermined relationship with one another. The device also includes at least one optical filter disposed in the second cavity where respective surfaces of the optical filter and second cavity are in contact and arrange the optical filter and second cavity in a second predetermined relationship with one another. Furthermore, the first and second predetermined relationships passively align the optical filter and mirror to perform one of a demultiplexing and multiplexing function using an optical signal incident on the optical filter.

Another embodiment described in this disclosure is an optical device with a sub-mount that includes a first substrate comprising a first cavity and a second cavity, each extending from a same surface into the first substrate. The sub-mount also includes a mirror disposed in the first cavity, where respective surfaces of the mirror and first cavity are in contact and arrange the mirror and first cavity in a first predetermined relationship with one another. The sub-mount includes at least one optical filter disposed in the second cavity, wherein respective surfaces of the optical filter and second cavity are in contact and arrange the optical filter and second cavity in a second predetermined relationship with one another. Furthermore, the first and second predetermined relationships passively align the optical filter and mirror to perform one of a demultiplexing and multiplexing function using an optical signal incident on the optical filter. The optical system includes a second substrate with a third cavity where respective surfaces of the first substrate and the third cavity are in contact and arrange the first substrate and third cavity in a third predetermined relationship with one another. The second substrate also includes an optical component configured to one of receive a single-wavelength optical signal from the optical filter and transmit the single-wavelength optical signal to the optical filter.

Example Embodiments

In a ROSA, a received multi-wavelength optical signal may be demultiplexed into a plurality of optical signals with respective wavelengths. Stated differently, the various wavelengths in the received optical signal are separated into different optical signals with different wavelengths. In a TOSA, multiple optical signals with respective wavelength may be multiplexed into a single multi-wavelength optical signal. In one embodiment, these optical sub-assemblies include a plurality of optical filters that is aligned with a mirror to perform the multiplexing/demultiplexing function. The embodiments herein disclose optical sub-assemblies where the optical components performing the multiplexing/demultiplexing function are aligned passively rather than actively.

In one embodiment, a sub-mount is etched to include respective cavities that each include at least two adjacent sides for aligning the optical filters and mirror. Moreover, the cavities are arranged on the sub-mount such that when the filters and mirror are disposed in the cavities and contact the two adjacent sides, they align in a manner that enables the multiplexing/demultiplexing function. That is, the filters and mirrors are aligned passively rather than actively where a technician must tune the sub-assemblies. The sub-mount may then be placed on a substrate that includes other components of the ROSA or TOSA. In one embodiment, the substrate is also etched to include a cavity with at least two adjacent sides for passively aligning the sub-mount with optical components disposed on the substrate.

FIG. 1 illustrates an optical system 100 for demultiplexing a multi-wavelength optical signal, according to one embodiment described herein. Generally, the system 100 uses a zig-zag demultiplexer to separate a multi-wavelength optical signal 110—i.e., a signal comprising of plurality of wavelengths—into a plurality of output optical signals with different wavelengths. In the embodiment shown, the optical signal 110 comprises four different wavelengths (also referred to as channels) which are separated into the four different output optical signals 121, 122, 123, and 124.

The demultiplexing system 100 includes an optical source 105, a mirror 120, a plurality of optical filters 115, lenses 125, and receivers 130. The optical source 105 may be an optical fiber, collimator, lens, etc. that transmits the multi-wavelength optical signal 110 in a direction towards the optical filter 115A. Because there are four different wavelengths in the optical signal 110, the system 100 includes four different optical filters 115 with respective pass bands for different wavelengths. Specifically, the optical filters 115 may each permit a different range of wavelengths from passing there through but reflects all other wavelengths. As such, the optical filters 115 may be made from a different material or composition, and thus, have different pass bands. For example, optical filter 115A permits a different range of wavelengths to pass than optical filters 115B, 115C, and 115D. However, the pass band of the optical filters 115 may overlap. In one embodiment, the optical filters may include thin-film-filters.

As shown, the optical signal 110 strikes optical filter 115A which permits one of the wavelengths of the signal 110 to pass through the filter 115A to generate the first output signal 121. That is, optical filter 115A has a pass band range that includes only one of the four wavelengths in the optical signal 110. Thus, the optical energy with this wavelength passes through the material of the optical filter 115A, while the other three wavelengths are reflected towards the mirror 120. The mirror 120 and the optical filters 115 are aligned such that the mirror 120 reflects the remaining three wavelengths of optical signal 110 to the optical filter 115B which permits only one of the remaining three wavelengths to pass. The optical energy at this wavelength passes through the filter 115B to generate the second output signal 122. Notably, the pass band of optical filter 115B does not need to exclude the wavelength that was removed to generate the first output signal 121 since this wavelength was already separated from the optical signal using filter 115A.

The two remaining wavelengths in optical signal 110 are reflected by filter 115B to mirror 120 which then reflects the signal 110 to optical filter 115C. Filter 115C has a pass band that permits only one of the two remaining wavelengths to pass through the filter 115C to generate the third output signal 123. The remaining wavelength is reflected off filter 115C onto the mirror 120 and onto the optical filter 115D which has a pass band that permits the last remaining wavelength to pass to generate the fourth output optical signal 124. Although it is not necessary to have the final optical filter 115D, it may be preferred to ensure that undesired wavelengths are not then transmitted to other stages in the system 100 and to maintain the same offset as the other three output signals 121, 122, and 123. In this manner, the system 110 demultiplexes the multi-wavelength optical signal 110 into four different output signals 121, 122, 123, and 124 with four different wavelengths.

These output signals then propagate through respective lenses 125 and receivers 130. In one embodiment, the receivers 130 are detectors (e.g., photo diodes) that convert the optical energy in the output optical signals 121, 122, 123, and 124 into electrical signals. In another embodiment, the receivers 130 are waveguides such as four optical fibers.

Moreover, although this disclosure refers to the output signals 121, 122, 123, and 124 having respective wavelengths, in some embodiments these output signals may include a range of respective wavelengths. However, in one embodiment, the range of the wavelengths of the output signals 121, 122, 123, and 124 may be non-overlapping—i.e., unique.

Figure 2:
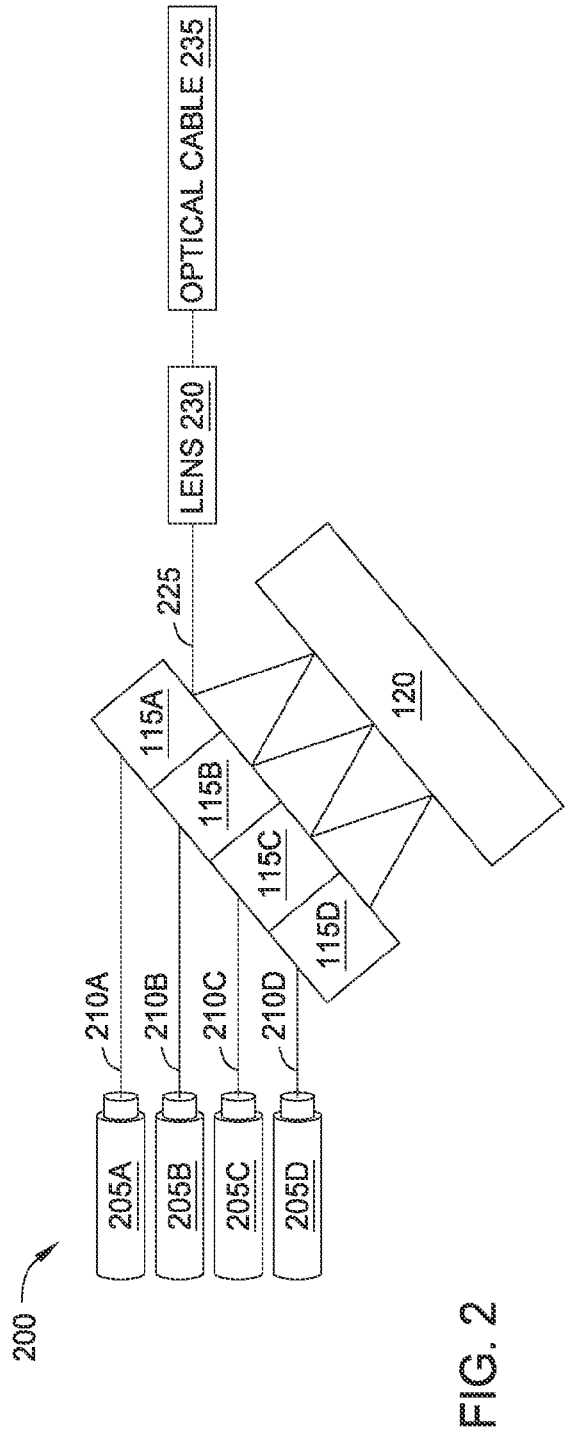
FIG. 2 illustrates multiplexing optical signals into a multi-wavelength optical signal, according to one embodiment described herein.

FIG. 2 illustrates an optical system 200 for multiplexing optical signals into a multi-wavelength optical signal, according to one embodiment described herein. Generally, the system 200 uses a zigzag multiplexer to combine (i.e., multiplex) four optical signals 210 with different wavelengths into a multi-wavelength optical signal 225. The four optical signals 210 may considered as four data channels that are then combined to generate optical signal 225. Of course, although FIGS. 1 and 2 illustrate four channel optical systems, the embodiments herein may be used when multiplexing or demultiplexing any number of channels.

As shown, optical system 200 includes light sources 205, optical filters 115, optical mirror 120, lens 230 and optical cable 235. The light sources 205 may be modulated lasers, collimators, optical cables, and the like which respectively output the signals 210. As discussed above, each of the optical signals 210 include a wavelength (or range of wavelengths) different from the other optical signals 210. Moreover, by reversing the demultiplexing process described above using the optical filters 115 and the mirror 120, the optical system 200 can multiplex the four optical filters into the multi-wavelength signal 225.

Starting from the bottom, optical signal 210D outputted from source 205D propagates through optical filter 115D. That is, the material of filter 115D has a pass band that permits the wavelength of signal 210D to pass through while reflecting wavelengths outside of this band. Thus, if optical signal 210D includes an optical signal with a wavelength outside of the pass band, this signal is reflected while only the optical energy with wavelengths in the pass band continues through the filter 115D and strikes the mirror 120.

Optical signal 210C outputted from light source 205C is filtered by optical filter 115C such that only light within its pass band is permitted to pass through to mirror 120. In addition, the optical signal outputted from the optical filter 115D (which is reflected by mirror 120) strikes the right side of optical filter 115C, but because the optical signal is outside the pass band of filter 115C, it is reflected and combined with the optical signal 210C. Thus, the optical signal propagating from optical filter 115C to mirror 120 includes both optical signal 210D and optical signal 210C.

Optical signal 210B outputted from light source 205B strikes optical filter 115B, and assuming the signal 210B is within its pass band, passes through filter 115B and is outputted on its right side. Again, because the optical signal 210C and 210D are outside the pass band of optical filter 115B, these optical signals are reflected back towards the mirror 120 along with the optical signal 210B. Thus, on the right side of optical filter 115B, the optical signals 210B, 210C, and 210D have been combined—i.e., multiplexed.

Lastly, optical signal 210A outputted from light source 205A strikes filter 115A, and assuming signal 210A is within its pass band, passes through the filter 115A and is outputted on its right side where signal 210A is combined with optical signals 210B, 210C, and 210D. That is, the respective wavelengths of the signals 210B, 210C, and 210D are outside of the pass band of optical filter 205A, and thus, are reflected upon striking the right side of the filter 205A and combined with optical signal 210A to generate the multi-wavelength optical signal 225. Signal 225 then passes through lens 230 and is introduced into an optical cable 235 or any other type of waveguide or detector.

To achieve the demultiplexing and multiplexing functions shown in FIGS. 1 and 2, the optical filters 115 and mirror 120 are arranged according to a defined orientation relative to each other. For example, in optical system 100, the arrangement between the optical filters 115 and the mirror 120 is such that the optical signal reflected from the left side of the filters 115 is reflected by the mirror 120 onto the next adjacent optical filter 115 so the optical signal 110 can be separated into its different wavelengths. Similarly, in optical system 200, filters 115 and mirror 120 are arranged so that optical signals passing through a lower filter 115 is reflected by the mirror 120 onto the right side of the next adjacent optical filter 115 and combined to form the multi-wavelength optical signal 225.

In one embodiment, the optical filters 115 and mirror 120 are aligned passively rather than actively. As will be described below, a substrate includes alignment features that cause the filters 115 and mirror 120 to align passively as they are disposed onto the substrate. In contrast, an active alignment technique may require a technician to iteratively adjust and test the optical system to determine when the filters 115 and mirror 120 are aligned. Aligning the components actively can take a technician hours to perform, which adds substantial cost to any component that includes optical system 100 or 200.

Figure 3A:
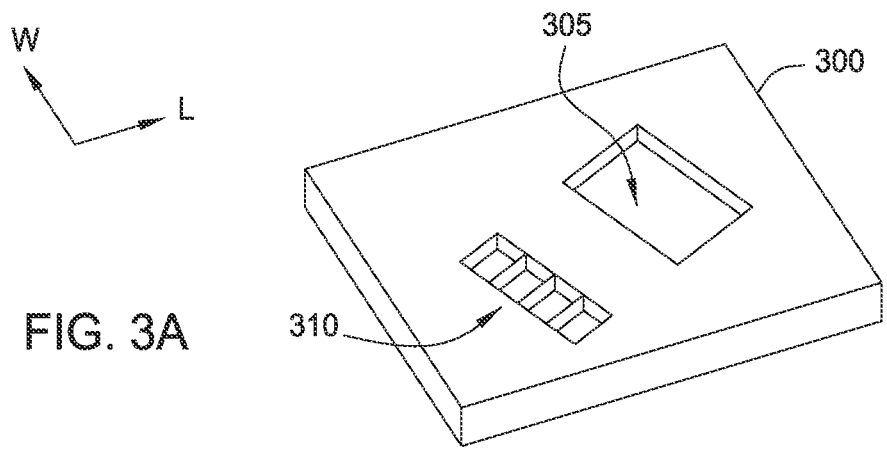
FIG. 3A is a sub-mount with cavities for optical components, according to one embodiment described herein.

FIG. 3A is a sub-mount 300 with cavities for optical components, according to one embodiment described herein. As shown, sub-mount 300 includes cavity 305 and a plurality of cavities 310. In one embodiment, cavity 300 is etched into the sub-mount 300 with width (W) and length (L) dimensions that substantially match the dimensions of a mirror. As used herein, dimensions that "substantially match" does not necessarily mean the dimensions are exactly the same but rather that the dimensions are close enough such that when a cavity is mated with a component (e.g., the mirror) the position of the mirror is fixed. That is, in this embodiment, the mirror fits snugly into the cavity 300 so that mirror adopts the orientation of the cavity 300. Moreover, although sub-mount 300 includes a unitary cavity 305 for the mirror, if the mirror is segmented, sub-mount 300 may a respective cavity for each of the segments.

Figure 3B:
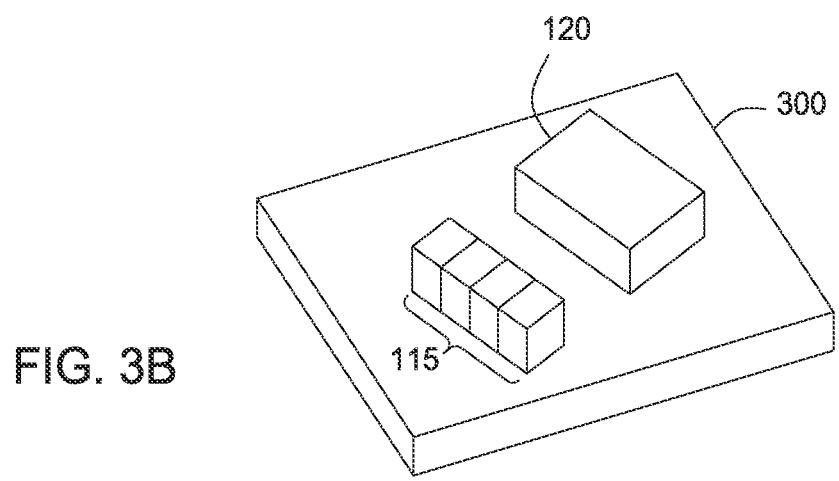
FIGS. 3B-3C are sub-mounts with aligned optical components, according to one embodiment described herein.

Similarly, the plurality of cavities 310 may have dimensions that substantially match the dimensions of the optical filters so that the filters adopt the orientation of the cavities 310. Thus, the cavities 305 and 310 may be formed on the sub-mount 300 in such a manner that when the mirror 120 and optical filters 115 are placed within the cavities as shown in FIG. 3B, the filters 115 and mirror 120 are aligned to perform the demultiplexing or multiplexing functions discussed in FIGS. 1 and 2. That is, the mirror 120 and filters 115 are aligned passively. In one embodiment, the position and/or orientation of the mirror 120 and filters 115 are not adjusted by a technician during an active tuning process.

The material of the sub-mount 300 may be a semiconductor (e.g., silicon), ceramic, or a circuit embedded in plastic or polymer. In one embodiment, the sub-mount 300 may be an interposer or an optical bench with multiple layers of metallization for routing signals through the sub-mount 300. However, the material of the sub-mount 300 is not limited to the materials mentioned above. Instead, the sub-mount 300 may include any material for which there are fabrication techniques that permit forming the cavities 310 and 305 with enough precision to substantially match the dimensions of the optical filters 115 and mirror 120 to enable passive alignment.

In one embodiment, the length and width of the cavity 305 may range from 100 nm up to tens of microns. More specifically, the length and width may range from 1 micron to 5 microns. In one embodiment, the length and width of each of the cavities 310 may range between 100 nm up to tens of microns. More specifically, the length and width of the cavities 310 may be between 0.5 microns and 5 microns. In one embodiment, the length and width of the sub-mount 300 may range from 1 micron to hundreds of microns. More specifically, the length and width of the sub-mount 300 may range from 1 micron to tens of microns.

Figure 3C:
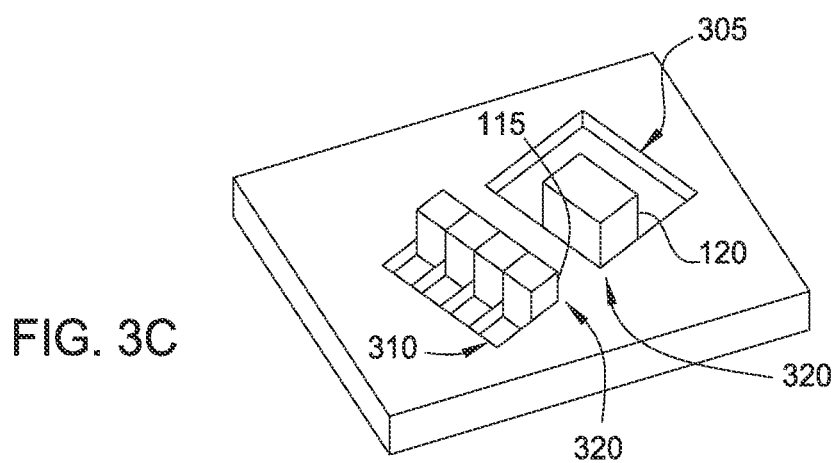

FIG. 3C illustrates cavities 305 and 310 with dimensions that do not substantially match the dimensions of the filters 115 or mirror 120. In this embodiment, the cavities 305 and 310 include at least two adjacent sides that are fabricated to passively align the mirror 120 or filters 115. For example, a filter 115 is placed in one of the cavities 310 and one corner of the filter 115 is mated with the corner formed by the two adjacent sides of the cavity 310. By aligning a corner of the filter 115 to the corner of the cavity 310 formed by the two adjacent sides, the filter 115 is passively aligned. Stated differently, the cavities 305 and 310 each include at least two adjacent sides that are selected to form at least one an alignment corner 320. By contacting to two sides on the filter 115 or mirror 120 with the two adjacent sides, the optical components are passively aligned. As such, the cavities 305 and 310 may have dimensions that do not substantially match the dimensions of the filters 115 and mirror 120 and still achieve passive alignment. For instance, the width and length of the cavities 305 and 310 may exceed the width and length of the surfaces of the filters 115 and mirror 120 disposed in the cavities and achieve passive alignment by aligning a corner of the filters 115 and mirror 120 into a corner defined by two adjacent sides of the cavity that is designed to align the optical components to perform a multiplexing or demultiplexing function.

Although not shown, the two adjacent sides selected to form the alignment corners 320 may include alignment features such as bumps that extend from the sides to contact and align the optical filters 115 and mirror 120. In one embodiment, a corner of the optical filter 115 or mirror 120 mates with the alignment corner 320 but this is not a requirement. For example, the corners of the filters 115 or mirror 120 may be chamfered, and thus, would not directly contact the alignment corners 320 formed by the two adjacent sides of the cavities 305 and 310.

Furthermore, the cavities 305, 310 illustrated in FIGS. 3A-3C can be any shape with any number of sides so long as at least two sides are selected to register with respective surfaces of the filters 115 or mirror 120 in order to align the optical components to perform a demultiplexing or multiplexing function. In addition, the cavities 305, 310 do not have to form corners where two sides intersect but can form any feature that permits the sides of the cavities to register with respective surfaces of the filters 115 or mirror 120 such that the desired alignment is achieved.

Figure 4A:
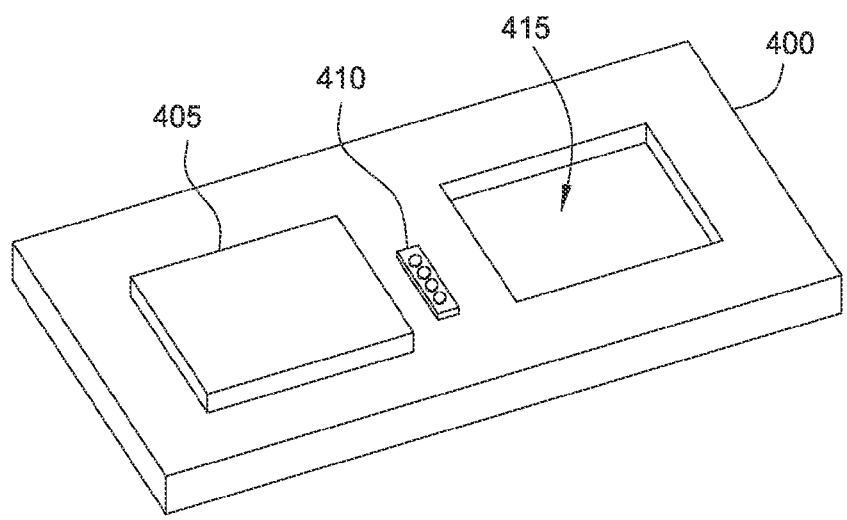
FIGS. 4A-4C illustrate assembling an optical receiver, according to one embodiment described herein.
Figure 4B:
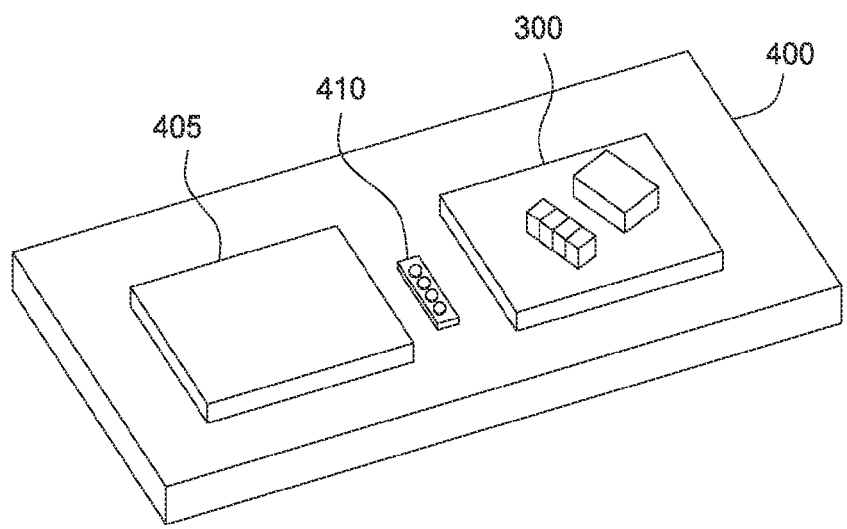
Figure 4C:
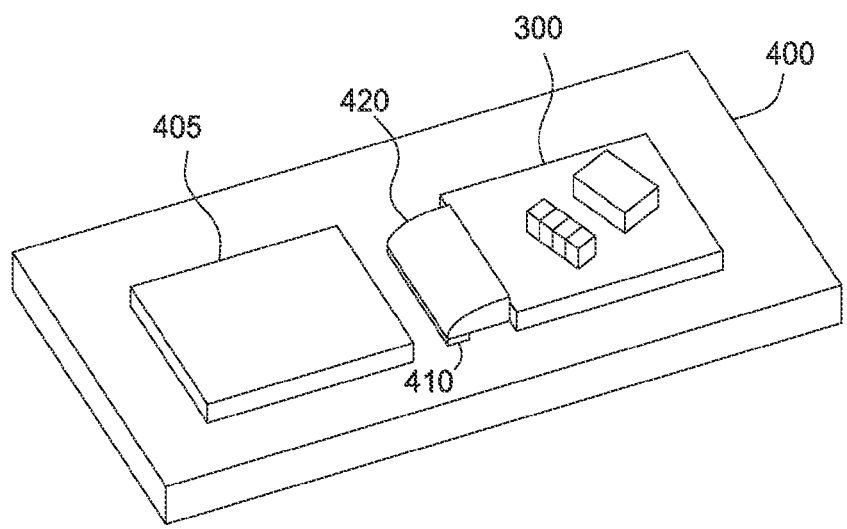

FIGS. 4A-4C illustrate assembling an optical receiver, according to one embodiment described herein. In one embodiment, the optical receiver is a component in a ROSA. As shown in FIG. 4A, the receiver includes a substrate 400, electrical integrated circuit (IC) 405, a detector array 410 of photodiodes, and a cavity 415. In previous fabrication steps, the IC 405 and detector array 410 are mounted onto the substrate 400. In one example, the substrate 400 includes one or more metallization layers that provide signal communication between the detector array 410 and the IC 405. In addition, the cavity 415 is etched into the substrate 400. In one embodiment, the cavity 415 has width and length dimensions that substantially match the dimensions of the sub-mount 300 illustrated in FIGS. 3A-3B. As such, when the sub-mount 300 is disposed in the cavity 415 as shown in FIG. 4B, the sub-mount 300 and the components disposed thereon are passively aligned with one or more components mounted on the substrate 400—e.g., the detector array 410. Alternatively, the cavity 415 may have dimensions that do not substantially match the dimensions of the sub-mount 300 but may include two adjacent sides that are selected to form an alignment corner. The sub-mount 300 may be disposed into the cavity 415 and arranged such that respective sides of the sub-mount 300 contact the two adjacent sides which passively aligns the optical components of the sub-mount 300 to one or more optical components disposed on the substrate 400.

In one embodiment, the demultiplexing function performed by the optical filters and mirror on the sub-mount 300 is used to separate a received optical signal that includes four different wavelengths into four optical signals, each comprising one of the four wavelengths. As shown in FIG. 4C, a lens array 420 is disposed between the optical filters on the sub-mount 300 and the detector array 410. The array 420 may include four individual lenses each aligned with a respective one of the optical filters. The lenses focus the four optical signals passing through the optical filters onto the photodiodes in the detector array 410. The photodiodes convert the optical signals into respective electrical signals that may then be amplified using, for example, a transimpedance amplifier that is either located on IC 405 on elsewhere on the substrate 400 proximate to the detector array 410. The amplified electrical signals may then be processed by the IC 405 and transmitted to other parts of the optical receiver. Eventually, the electrical signals may be converted into data signals that are sent to an external computing device (e.g., a server).

Figure 5:
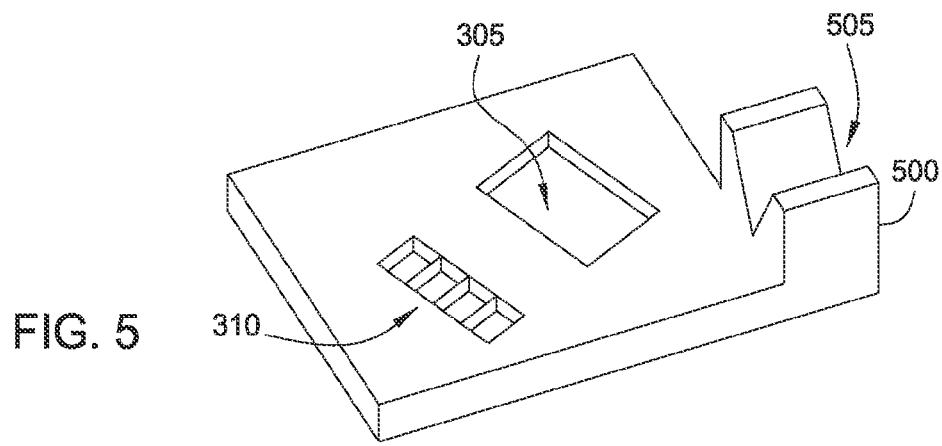
FIG. 5 is a sub-mount with an integrated groove, according to one embodiment described herein.

FIG. 5 is a sub-mount 500 with an integrated groove 505, according to one embodiment described herein. Sub-mount 500 differs from sub-mount 300 in FIG. 3 in that sub-mount 500 includes the integrated groove 505 for mounting a light source onto the sub-mount 500. The groove 505 may be arranged such that an optical source placed in the groove 505 is aligned with the optical filter placed in the bottommost one of the cavities 310. Thus, when the optical source transmits a multi-wavelength optical signal, the demultiplexing function shown in FIG. 1 is performed. Moreover, the integrated groove 505 permits the optical source to be aligned passively. That is, disposing the optical source into the groove automatically aligns the optical source to the bottom most optical filter. In one embodiment, a technician does not need to actively adjust the optical source in order to align the source to the optical filters. Of course, if sub-mount 500 is used rather than sub-mount 300 in the optical receiver shown in FIG. 4A, then the dimensions of the cavity 415 may be modified to accommodate the width and length dimensions of sub-mount 500 which includes the integrated groove 505.

Although integrated groove 505 includes a V-shaped groove, in another embodiment the groove 505 may be U-shaped or any other shape suitable for holding and aligning an optical source. For example, the optical source may be a collimator or the core of an optical cable that is placed within the groove 505. The optical source may be fixed into the groove 505 using an epoxy.

In one embodiment, the sub-mount 500 may be made of the same materials as the sub-mount 300. In one example, the sub-mount 500 may be made of a semiconductor where the portion of the sub-mount 500 forming the groove 505 has the same crystalline structure of the portion that defines the cavities 310 and 305. For example, the cavities 305, 310 and integrated groove 505 may be formed from a single crystal semiconductor substrate.

Figure 6A:
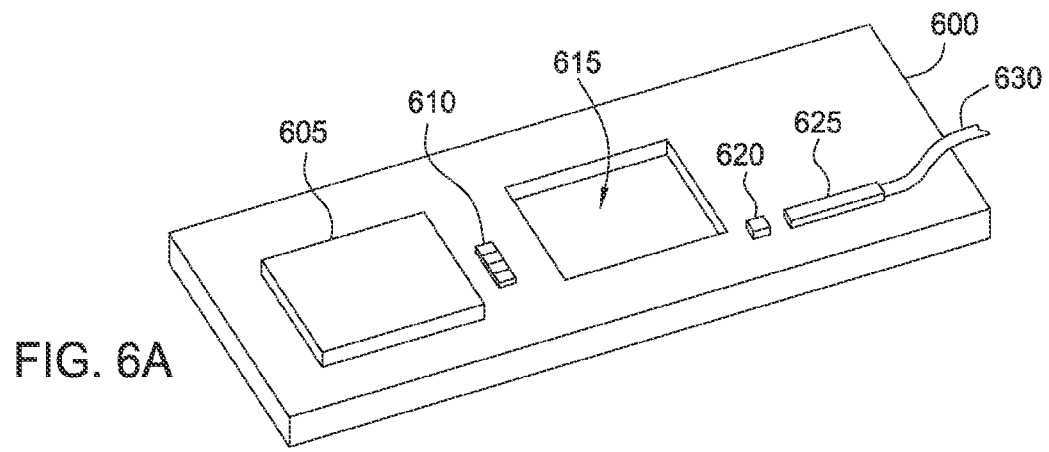
FIGS. 6A-6B illustrate assembling an optical transmitter, according to one embodiment described herein.
Figure 6B:
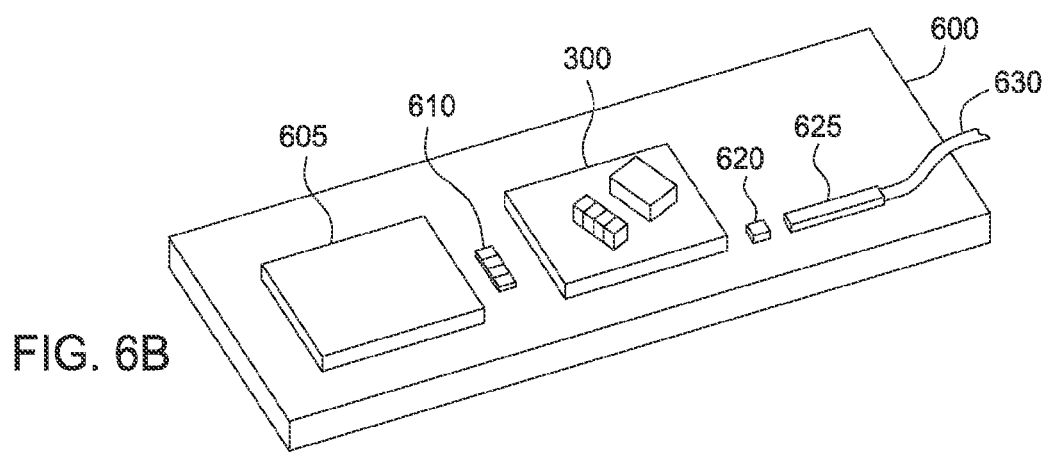

FIGS. 6A-6B illustrate assembling an optical transmitter, according to one embodiment described herein. In one embodiment, the optical transmitter is a component in a TOSA. As shown in FIG. 6A, the transmitter includes a substrate 600, an electrical IC 605, optical source array 610, cavity 615, lens 620, connector 625, and optical cable 630. The IC 605, optical source array 610, and connector 625 may have been mounted on the substrate 600 during previous fabrication steps. In one example, the substrate 600 includes one or more metallization layers that provide signal communication between the IC 605 and the optical array 610. As shown, the optical source array 610 includes four individual optical sources (e.g., laser assemblies). Each of these optical sources may transmit an optical signal with a different wavelength. The IC 605 may provide control signals that cause the optical sources to transmit their respective optical signals.

As shown in FIG. 6B, the sub-mount 300 shown in FIG. 3 is disposed within cavity 615. In one embodiment, the cavity 615 has width and length dimensions that substantially match the dimensions of the sub-mount 300. As such, when the sub-mount 300 is disposed in the cavity 615, the sub-mount 300 and the components disposed thereon are passively aligned with one or more components mounted on the substrate 600. For example, each of the optical sources in the array 610 aligns with a respective one of the optical filters on sub-mount 300. This alignment is achieved by etching cavity 615 to have dimensions that substantially match the dimensions of the sub-mount 300 and by arranging the cavity 615 at a location of substrate 600 such that the outputs of the optical sources in array 610 align with a respective one of the optical filters on the sub-mount 300.

Once aligned, the optical filters and mirror on sub-mount 300 combine the four optical signals into a multi-wavelength optical signal using the multiplexing function shown in FIG. 2. This multi-wavelength optical signal is transmitted into lens 620 which then focuses the signal into the connector 625 and optical fiber 630. The optical fiber may then transmit the signal to an optical receiver that is external to the optical transmitter shown in FIGS. 6A and 6B.

Figure 7:
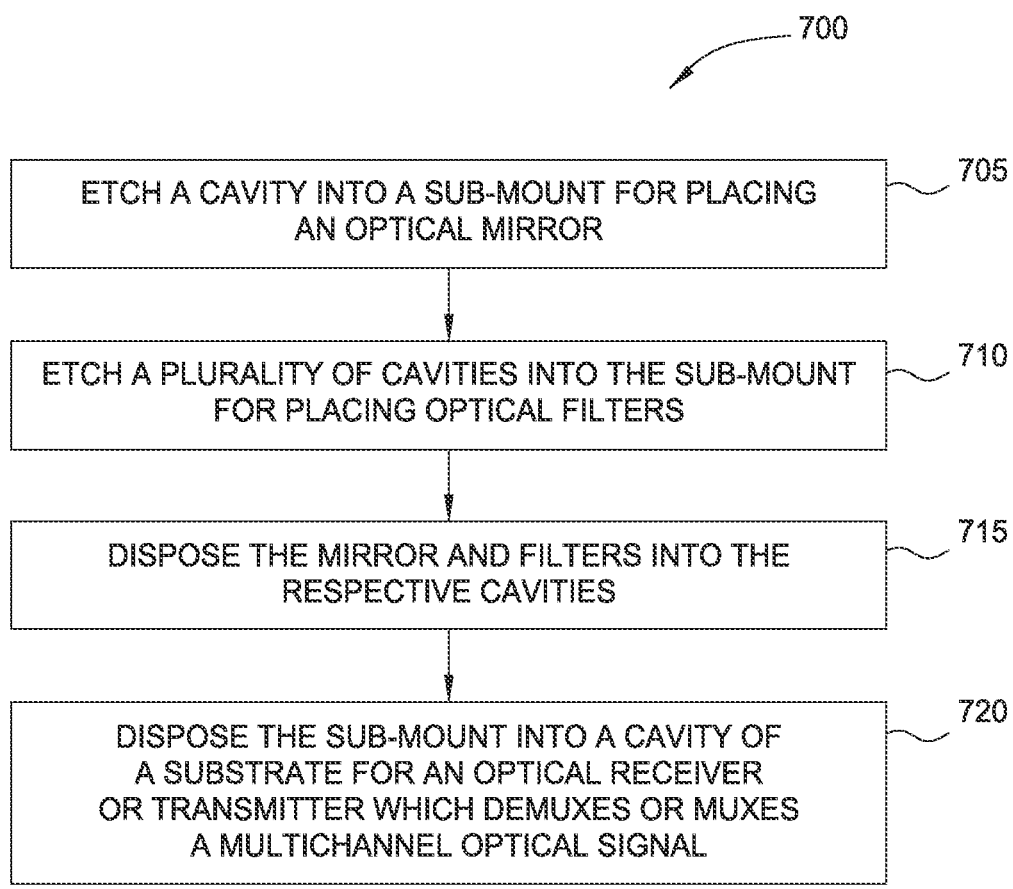
FIG. 7 is a method for passively aligning optical components in a multiplexer/demultiplexer, according to one embodiment described herein.

FIG. 7 is a method 700 for passively aligning optical components in a multiplexer/demultiplexer, according to one embodiment described herein. At block 705, a cavity is etched into the sub-mount for placing an optical mirror. At block 710, a plurality of cavities is etched into the sub-mount for placing optical filters. As discussed above, the cavities may have dimensions that substantially match the dimensions of the mirror or optical filters. As such, when the mirror and filters are disposed into the cavities, these components adopt the orientation of the cavities. Moreover, the cavities formed during blocks 705 and 710 are etched at predetermined locations relative to each other so that the optical filters and mirror disposed in the cavities perform a multiplexing/demultiplexing function. Thus, the fabrication techniques or techniques used to form the cavities during block 705 and 710 may be any technique with enough precision to form the cavities to have dimensions that substantially match the dimensions of the mirror and optical filters as well as arrange the cavities relative to each other so that the multiplexing/demultiplexing function is enabled when the mirror and filters are disposed in the cavities. A non-limiting example of fabrication techniques sufficient to achieve these goals is semiconductor fabrication techniques which, in the case of silicon, can currently provide features with a resolution of 22 nm.

In one embodiment, the cavity formed at block 705 is etched into the same surface of the sub-mount as the plurality of cavities etched during block 710. Moreover, although shown as two separate blocks, etching the cavities for the mirror and the optical filters may occur during the same etching step, and thus, the cavities may have the same depth. In another example, the cavity formed at block 705 is etched at a different time than the cavity formed at block 710. Thus, the cavities may have different depths. Furthermore, in one embodiment, the number of cavities formed during block 710 may be the same as the number of optical filters—i.e., a one to one relationship. Alternatively, the optical filters may be combined into a single structure rather than being, for example, four individual structures. For instance, the four optical filters may be formed from the same material that is then processed to form the four filters, or the four filters may have been attached using an adhesive to form a unitary structure. In either case, at block 710 only one cavity may be formed which has dimensions that substantially match the unitary structure that includes the different optical filters rather that forming a plurality of cavities for each of the optical filters.

At block 715, the mirror and optical filters are disposed into the respective cavities in the sub-mount. Because the dimensions of the cavities substantially match the dimensions of the mirror and optical filters, once placed, the mirror and optical filters are aligned passively and able to perform multiplexing or demultiplexing as described above.

At block 720, the sub-mount is disposed into a cavity of a substrate in an optical receiver or transmitter. In one embodiment, the dimensions of the cavity in the substrate substantially match the dimensions of the sub-mount. Thus, placing the sub-mount into the cavity passively aligns the sub-mount to one or more components on the substrate. For example, if the substrate is part of an optical receiver, the sub-mount is aligned with an optical source on the substrate such that a multi-wavelength optical signal transmitted by the optical source is incident upon one of the optical filters on the sub-mount. The optical filters and mirror then perform a demultiplexing function on the multi-wavelength signal. Alternatively, if the substrate is part of an optical transmitter, the sub-mount may be aligned with a plurality of optical sources that each transmits an optical signal onto a respective optical filter. The optical filters and mirror then perform a multiplexing function to combine the optical signals.

In one embodiment, the sub-mount or the substrate may include one or more visual alignment features (e.g., fiducial markers) such as a cross or circular target that improve the ability for a technician or automated machine to place the optical filters and mirror onto the sub-mount or to place the sub-mount onto the substrate. For example, the alignment features may be etched into, or formed on, the sub-mount or substrate.

Figure 8:
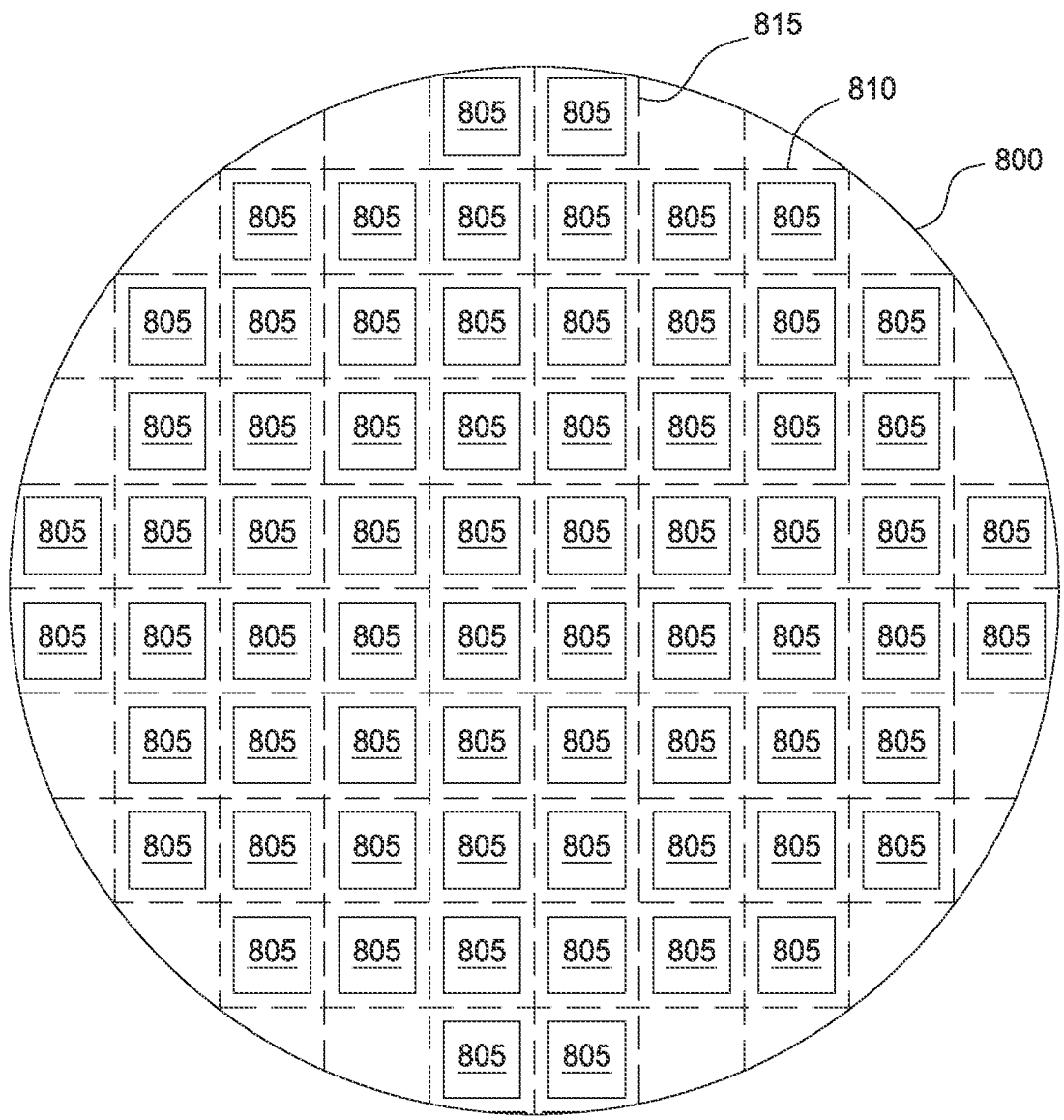
FIG. 8 is a wafer including a plurality of optical sub-assemblies, according to one embodiment described herein.

FIG. 8 is a wafer 800 including a plurality of optical assemblies 805, according to one embodiment described herein. As shown, the assemblies 805 are repeated throughout the wafer 800. In one embodiment, each optical assembly 805 is a sub-mount 300 like the one shown in FIG. 3A. For example, the semiconductor wafer 800 may be etched to form the cavities 310 and 305 in each of the assemblies 805. Once the cavities are formed, a technician or an automated machine may place the optical filters and mirror into the cavities of each assembly 805. The wafer 800 may then be diced along the vertical lines 815 and horizontal lines 810 to separate the optical assemblies 805. The assemblies 805 may then be mounted onto a substrate of an optical receiver or transmitter as shown in FIGS. 4B and 6B. In this manner, the sub-mounts 300 may be fabricated at a wafer level rather than individually.

In another embodiment, each optical assembly 805 includes a substrate for an optical receiver or transmitter like the ones shown in FIGS. 4B and 6B. The wafer 800 may be processed to include, for example, the metallization layers that route electrical signals between the IC 405 shown in FIG. 4A and the detector array 410. In addition, the substrates in the assemblies 805 may be etched to include the cavity 415 for holding the sub-mount 300. A technician or an automated machine may then dispose a respective sub-mount 300 into the cavities 415 in each of the optical assemblies 805. As discussed above, the sub-mount 300 may have been formed on a different wafer and then diced into individual components which are then disposed onto the assemblies 805 of wafer 800. Once the transmitters or receivers are assembled, the wafer 800 is diced along the lines 810 and 815 to form individual transmitters or receivers. In this manner, the optical receivers or transmitters shown in FIGS. 4B and 6B may be fabricated at a wafer level rather than individually.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
   disposing a mirror into a first cavity of a substrate such that respective surfaces of the mirror and first cavity are brought into contact and arrange the mirror and first cavity into a first predetermined relationship with one another;

disposing an optical filter into a second cavity of the substrate such that respective surfaces of the optical filter and second cavity are brought into contact and arrange the optical filter and second cavity into a second predetermined relationship with one another, wherein the first and second cavities are arranged relative to each other so that disposing the mirror and optical filter cause the mirror and the optical filter to be passively aligned to perform one of a demultiplexing and multiplexing function using an optical signal incident on the optical filter; and after disposing the mirror and the optical filter onto the substrate, disposing the substrate into a third cavity on a different substrate, wherein the different substrate comprises at least one optical component configured to one of receive a single-wavelength optical signal from the optical filter and transmit the single-wavelength optical signal to the optical filter.

2. The method of claim 1, wherein the third cavity comprises dimensions that substantially match dimensions of the substrate such that the optical filter is passively aligned with the at least one optical component mounted on the different substrate.

3. The method of claim 1, wherein etching the first cavity and etching the second cavity occur during the same etching step.

4. The method of claim 1, further comprising:
etching a plurality of cavities in the surface of the substrate; and
disposing each of a plurality optical filters into a respective cavity, each of the respective cavities comprises at least two alignment surfaces for aligning a respective one of the plurality of optical filters to perform one of the demultiplexing and multiplexing function, wherein the plurality of optical filters and mirror form a zigzag demultiplexer or multiplexer.

5. The method of claim 1, further comprising:
forming an integrated groove on the substrate for holding an optical source, wherein the integrated groove is aligned with the second cavity.

6. The method of claim 1, further comprising:
forming a plurality of substrates on a semiconductor wafer, each of the plurality of substrates comprising the first cavity and the second cavity;
disposing respective mirrors and optical filters into the first and second cavities of each of the plurality of substrates.

7. An optical device, comprising:
a sub-mount comprising:
a first substrate comprising a first cavity and a second cavity, each extending from a same surface into the first substrate,
a mirror disposed in the first cavity, wherein respective surfaces of the mirror and first cavity are in contact and arrange the mirror and first cavity in a first predetermined relationship with one another; and
at least one optical filter disposed in the second cavity, wherein respective surfaces of the optical filter and second cavity are in contact and arrange the optical filter and second cavity in a second predetermined relationship with one another,
wherein the first and second predetermined relationships passively align the optical filter and mirror to perform one of a demultiplexing and multiplexing function using an optical signal incident on the optical filter; and
a second substrate comprising:
a third cavity, wherein respective surfaces of the first substrate and the third cavity are in contact and arrange the first substrate and third cavity in a third predetermined relationship with one another, and
an optical component configured to one of receive a single-wavelength optical signal from the optical filter and transmit the single-wavelength optical signal to the optical filter.

8. The optical device of claim 7, wherein the optical component comprises a photo detector configured to convert the single-wavelength optical signal received from the optical filter into an electrical signal.

9. The optical device of claim 7, wherein the optical component comprises an optical source mounted on the second substrate and aligned with the optical filter, the optical source is configured to transmit the single-wavelength optical signal to the optical filter.

10. The optical device of claim 7, wherein the sub-mount comprises a plurality of optical filters each disposed in a respective cavity extending from the same surface into the first substrate, wherein the plurality of optical filters and mirror form a zigzag demultiplexer or multiplexer.

11. The optical device of claim 7, wherein the second substrate comprises an electrical integrated circuit communicatively coupled to the optical component.

12. The optical device of claim 11, wherein the electrical integrated circuit and optical component are mounted on a first surface of the second substrate, and wherein the third cavity extends from the first surface into the second substrate.

* * * * *